United States Patent
Willard

(10) Patent No.: US 10,899,206 B2
(45) Date of Patent: Jan. 26, 2021

(54) ATTACHMENT ASSEMBLIES FOR SOFT TOP PANELS

(71) Applicant: Webasto SE, Stockdorf (DE)

(72) Inventor: Michael T. Willard, Harrison Township, MI (US)

(73) Assignee: WEBASTO SE, Stockdorf (DE)

( * ) Notice: Subject to any disclaimer, the term of this patent is extended or adjusted under 35 U.S.C. 154(b) by 72 days.

(21) Appl. No.: 16/291,244

(22) Filed: Mar. 4, 2019

(65) Prior Publication Data

US 2019/0275870 A1 Sep. 12, 2019

Related U.S. Application Data

(60) Provisional application No. 62/640,973, filed on Mar. 9, 2018.

(51) Int. Cl.
*B60J 7/06* (2006.01)
*B60J 7/10* (2006.01)
*B60J 1/08* (2006.01)

(52) U.S. Cl.
CPC ............... *B60J 7/104* (2013.01); *B60J 1/085* (2013.01)

(58) Field of Classification Search
CPC .................................. B60J 7/104; B60J 1/085
See application file for complete search history.

(56) References Cited

U.S. PATENT DOCUMENTS

| | | | | |
|---|---|---|---|---|
| 4,681,362 A | * | 7/1987 | Taylor | B60J 7/104 296/78.1 |
| 4,757,854 A | * | 7/1988 | Rippberger | B44C 7/022 160/391 |
| 5,458,390 A | * | 10/1995 | Gilbert | B62J 17/00 296/78.1 |
| 5,702,147 A | * | 12/1997 | Essig | B60J 7/104 135/119 |
| 6,120,083 A | * | 9/2000 | Gunther | B62J 17/04 150/167 |
| 6,817,647 B1 | * | 11/2004 | Green | B60J 7/10 296/102 |
| 6,827,391 B1 | | 12/2004 | Kohn et al. | |
| 8,430,444 B1 | * | 4/2013 | West | B62K 5/01 296/77.1 |
| 9,238,400 B2 | * | 1/2016 | Hanson | B60J 7/10 |
| 9,688,336 B2 | * | 6/2017 | Lafleur | B62J 17/00 |
| 2005/0258664 A1 | | 11/2005 | Willard | |
| 2018/0229588 A1 | * | 8/2018 | Lewis | B60J 1/085 |

* cited by examiner

*Primary Examiner* — Lori L Lyjak
(74) *Attorney, Agent, or Firm* — . Fitch, Even, Tabin & Flannery, LLP

(57) ABSTRACT

A vehicle soft top with a removable panels having interconnecting strips that can be aligned with one another and snap fitted to attach to each other. In one embodiment, a assembly to attach components of a vehicle soft top having a top panel, a side panel and a rear panel may have a first strip connected along a portion of an edge of the top panel, the first strip having a plurality of spaced tabs raised from the first strip by a stem; a second strip connected along a portion of a top edge of at least the side panel, the second strip having a plurality of spaced openings, which are aligned and spaced to securely and removably receive and retain a portion of an edge of the tabs of the first strip and a portion of an edge of the stem of the tabs of the first strip.

10 Claims, 15 Drawing Sheets

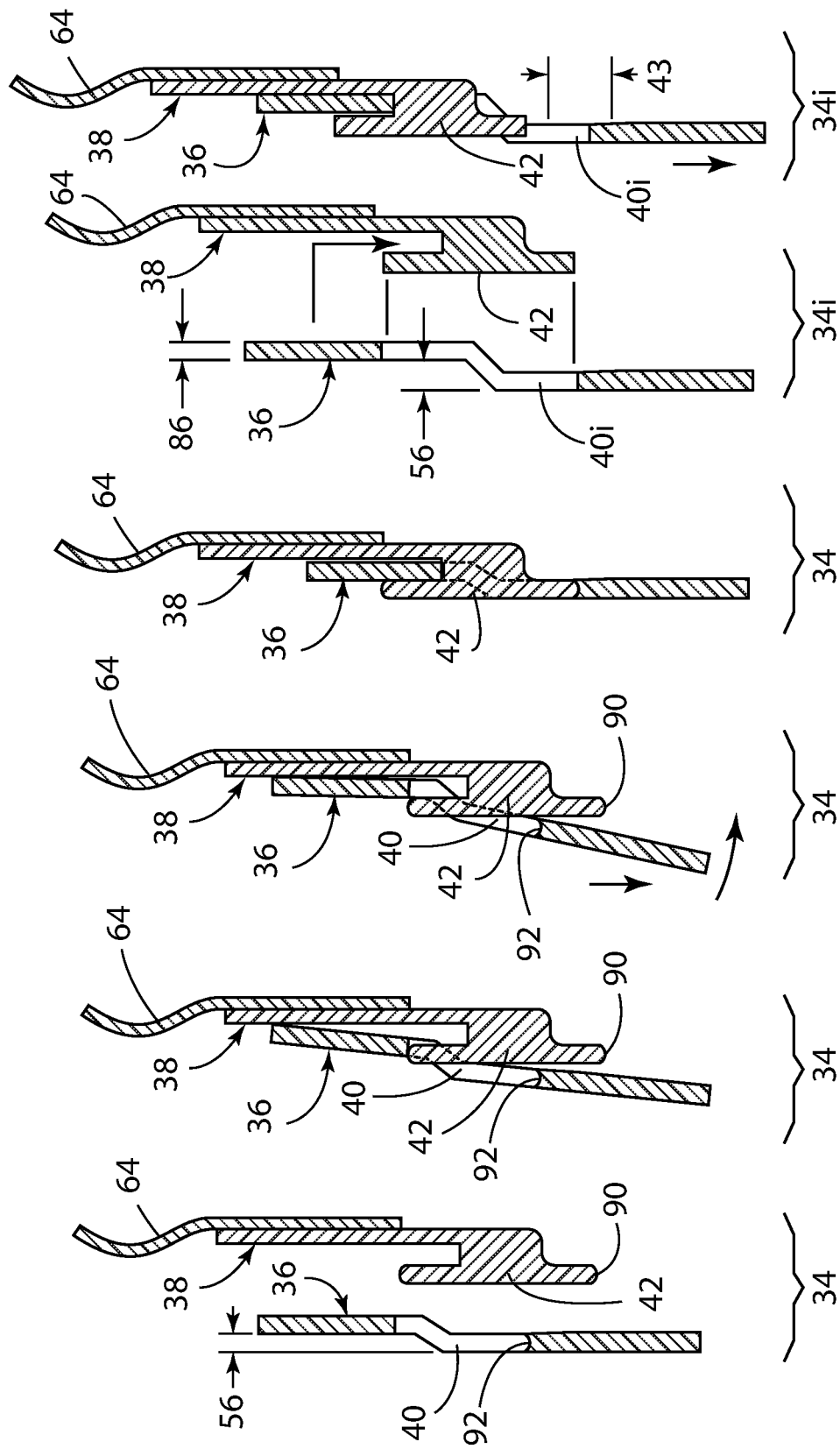

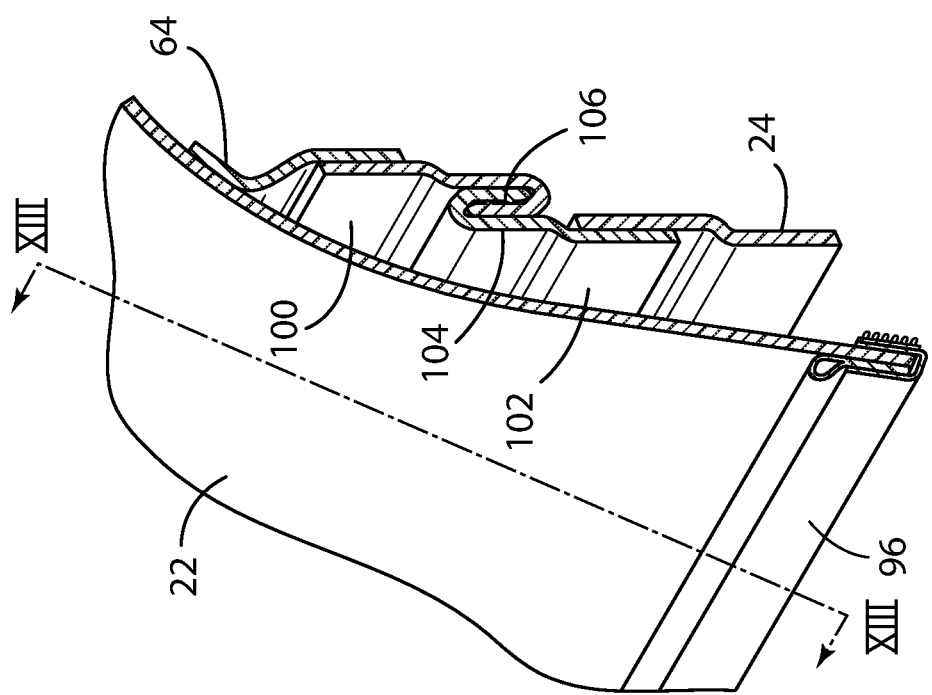
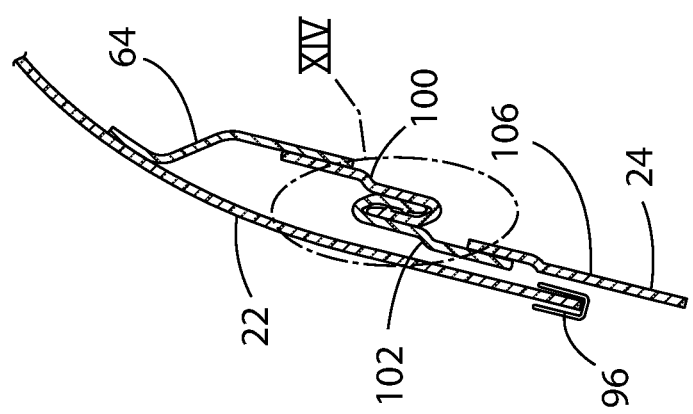
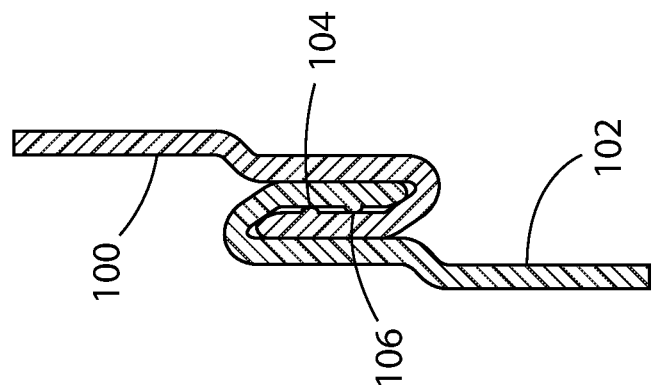
FIG. 14
FIG. 13
FIG. 12

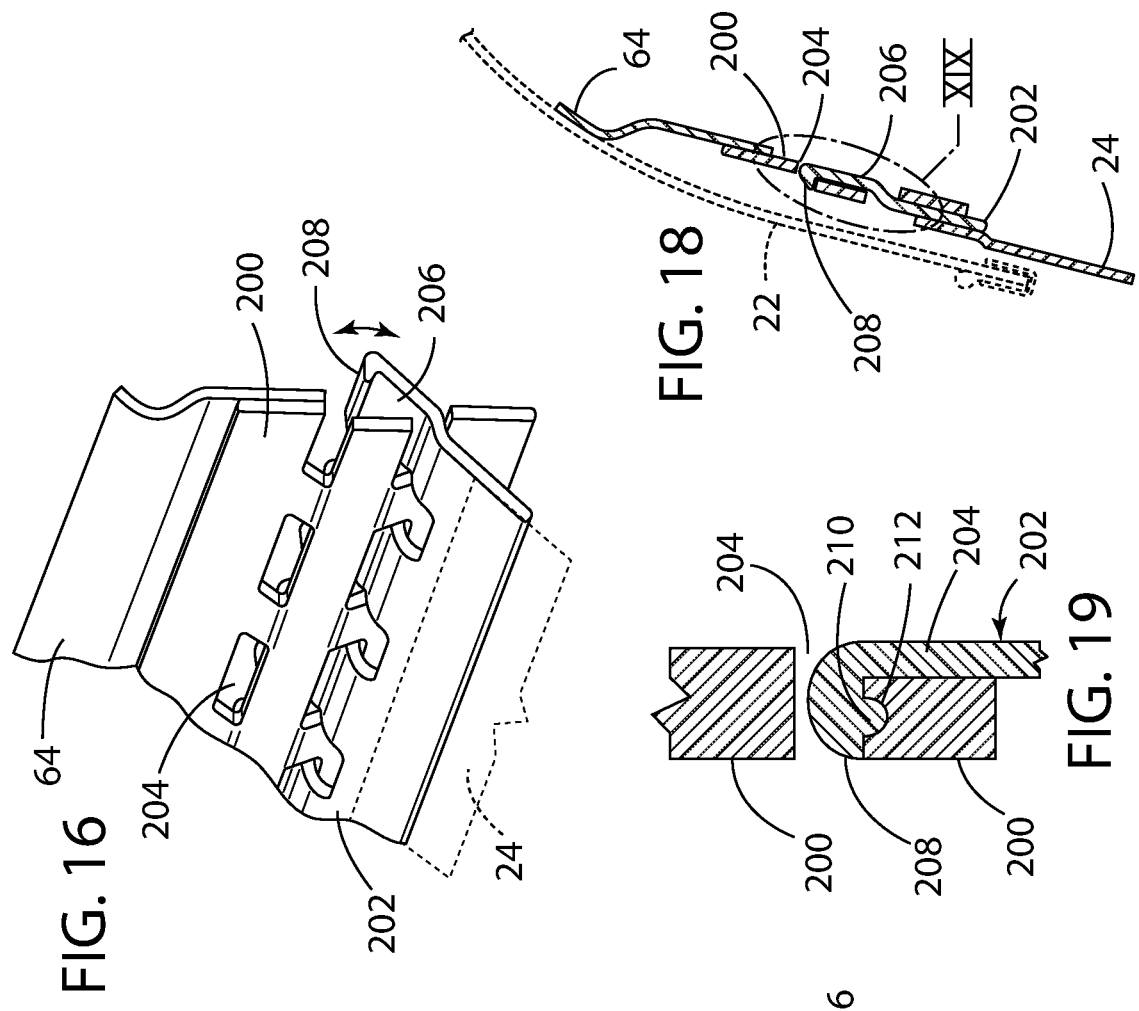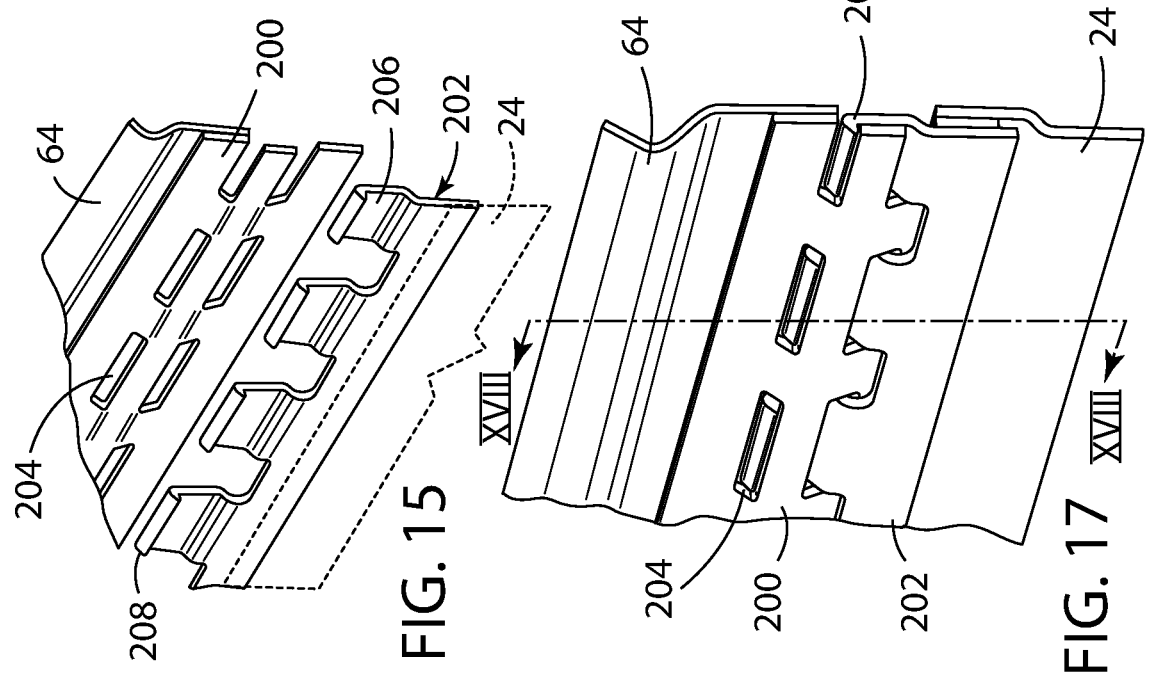

ATTACHMENT ASSEMBLIES FOR SOFT TOP PANELS

CROSS-REFERENCE TO RELATED APPLICATIONS

This application claims benefit from U.S. Provisional Application No. 62/640,973, filed Mar. 9, 2018, which is hereby incorporated herein by reference in its entirety for all purposes.

FIELD

Presented herein are attachment assemblies to connect various components/panels/welts/windows (panels) for a soft top of a vehicle, and in particular, assemblies to connect panels for a soft top of a vehicle having interconnecting attachment assemblies.

BACKGROUND

Soft tops are popular on many types of vehicles, such as sport utility vehicles, boats, and the like, given the various possible and desirable user configurations. When installed, a soft top can provide shelter to the vehicle cabin or cockpit from wind and weather. When desired, soft tops, or individual soft top components (such as side, top, rear and window panels and the like), can be removed to open or partially open the vehicle cabin or cockpit to the open air.

Soft top panels are typically secured to the vehicle by a rigid framework in a removable manner and are also typically removably interconnected to each other, often using various types of zippers. As is known in the art, zippers exposed to the elements or to frequent use can fail and/or be difficult to attach, reattach, and/or to open or close.

Accordingly, alternative means to attach soft top panels to each other without the problems known in the art are desired.

SUMMARY

Accordingly, to advance at least the aforementioned deficiencies in the art, described herein are assemblies to removably attach soft top panels to each other. A vehicle soft top is provided herein with removable panels having interconnecting strips that can be aligned with one another and snap fitted to attach to each other. In one embodiment, an assembly to attach components of a vehicle soft top having a top panel, a side panel and a rear panel may have a first strip connected along a portion of an edge of the top panel, the first strip having a plurality of spaced tabs raised from the first strip by a stem; a second strip connected along a portion of a top edge of at least the side panel, the second strip having a plurality of spaced openings, which are aligned and spaced to securely and removably receive and retain a portion of an edge of the tabs of the first strip and a portion of an edge of the stem of the tabs of the first strip. The strips can be about 1.5 mm thick and the spaced tabs and openings can be about 75 mm apart.

In one approach, the first strip connection along a portion of the edge of the top panel further comprises a fabric strip connecting the first strip to the top panel. The first and second strips may be made from are polyethylene or polypropylene. The bottom edge of the side panel can be removably connectable to the vehicle by a tension bow. In one approach, the soft top components may be further connected by a hook and loop fastener, whereby water seepage is reduced.

In another approach, the plurality of spaced openings of the second strip can be contained within a stepped portion and have a chamfer on the side where the plurality of spaced tabs enters, whereby attachment alignment is assisted. In one embodiment, the stepped portion is twice the thickness of the thickness of the tab and the chamfer portion is half the thickness of the step portion where the tab passes as it enters the spaced openings. The dimensions of the perimeter of the chamfer is greater than the perimeter dimensions of the tab.

Other features will become more apparent to persons having ordinary skill in the art to which the assemblies pertain and from the following description and claims.

BRIEF DESCRIPTION OF THE DRAWINGS

FIGS. 5B-5E sequentially show a side view of the attachment of securing the top male strip 38 to the bottom female strip 36 of the attachment assembly 34 embodiment of FIG. 2.

FIGS. 6A-6B sequentially show a side view of the attachment of securing the top male strip 38 to the bottom female strip 36i of the interlocking welt assembly 34i embodiment of another approach.

FIG. 12 illustrates a perspective sectional view of an attachment assembly of the present embodiments according to a third approach.

FIG. 13 is a cross-sectional side view taken along section lines XIII-XIII of FIG. 12.

FIG. 14 illustrates a close up side view of area XIV of FIG. 13.

FIG. 15 illustrates an exploded perspective view of an attachment assembly of the present embodiments according to a fourth approach.

FIG. 16 illustrates in mid-sequence the securing of the top female strip 200 to the bottom male strip 202 of the interlocking welt assembly embodiment of FIG. 15.

FIG. 17 illustrates the secured assembly of the attachment assembly embodiment of FIG. 15.

FIG. 18 is a cross-sectional side view taken along section lines XVIII-XVIII of FIG. 17.

FIG. 19 illustrates a close up side view of area XIX of FIG. 18.

Figure 1:
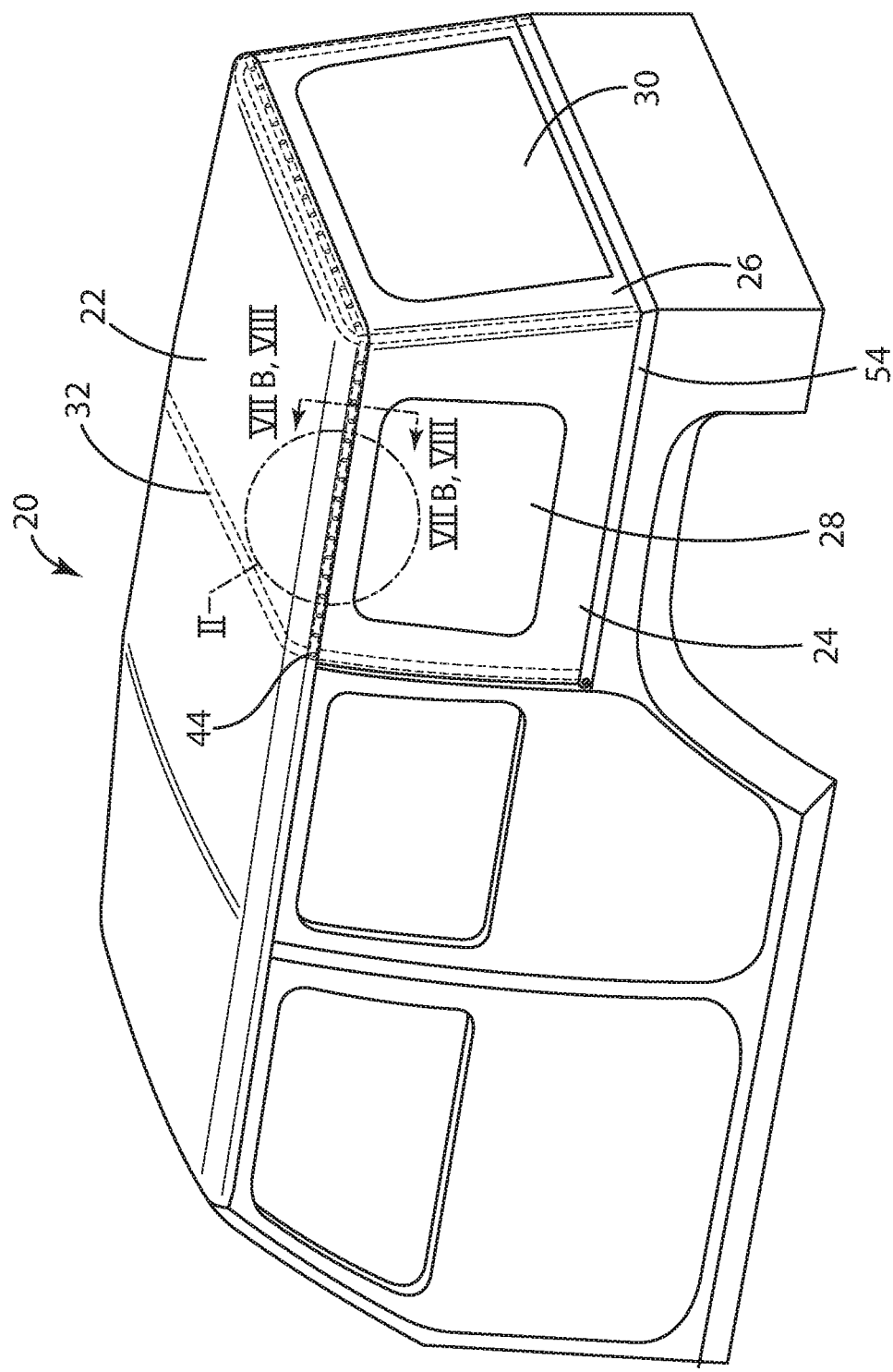
FIG. 1 illustrates a perspective view of a sport utility vehicle with a soft top covering the cabin area having a panel attachment assembly according to one of the present embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined herein.

DETAILED DESCRIPTION

Described herein are assemblies to interlock welts of material for a soft top of a vehicle. Generally, according to one of the preferred embodiments, mating male and female interlocking tab and hole/slot features can be used to install removable side and rear soft panels of a convertible SUV. The features would replace the need for zippers typically used in this application. Installation could include a vertical movement to engage the tabs into the holes (or in some embodiments, slots shown in FIGS. 15-19). The bottom of the panel could then be secured to the vehicle by a tension bow for easy access. The present embodiments improve the ease, speed and reliability of the panel installation process over current zipper solutions. It is noted that the illustrated tab and matching hole embodiments are described as ovals, rectangles and J-hooks. It is understood that other configurations using other geometric shapes are also possible within the scope of the present embodiments (e.g., circles, squares, triangles and the like).

In one approach, external tabs can be sewn onto upper canopy (soft top) to accept soft quarter window (side panel) with mating notch openings. Optional guide notches/chamfer on the back side of the quarter window attachment flange can help with panel alignment and installation. The attachment strips on the upper canopy and the removable quarter window can optionally have relief notches or living hinge features to allow the panels to be rolled or folded up into a compact package to be stored on the vehicle (See e.g., FIG. 11). Locking tab and slot feature spacing along the attachment strips can be determined based on the fabric and strength of the soft top and/or the attachment strips to reduce/prevent buckling or buffeting of the panels under high winds (e.g., 220 kilometers per hour). In one approach, there can be a 75 mm spacing between locking tabs. Also, according to one embodiment, 16 mm by 20 mm oval tabs can be about 1.25 mm thick with 8 mm by 12 mm oval standoffs (stems). Assembly strips with upper locking tabs and lower slots in one approach can be about 1100 mm long and 40 mm tall, again with 75 mm spacing between tabs.

According to another approach, attachment sections can use the same extruded section on upper canopy and lower removable quarter window. The extrusion can be J-hooks. This embodiment can also incorporate a few interlocking features for positive attachment feel (See, FIGS. 12-14).

According to another approach, attachment sections can use a tongue and grove section. In one exemplary embodiment, an extruded upper section with cut-out notches for removable quarter window mates with the extruded insert tab flange (See, FIGS. 15-19).

Figure 2:
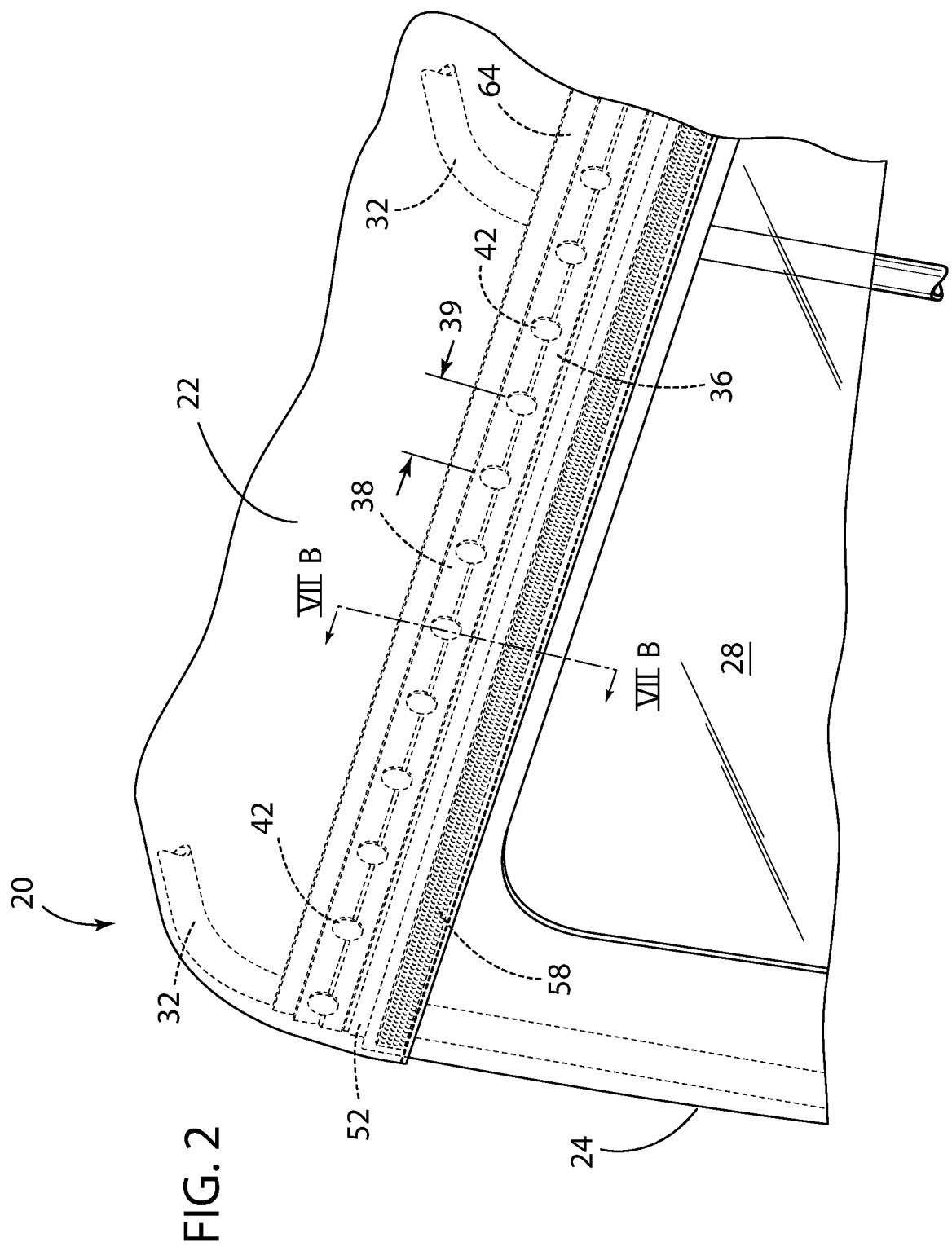
FIG. 2 illustrates a perspective close up view of area II of FIG. 1.
Figure 3:
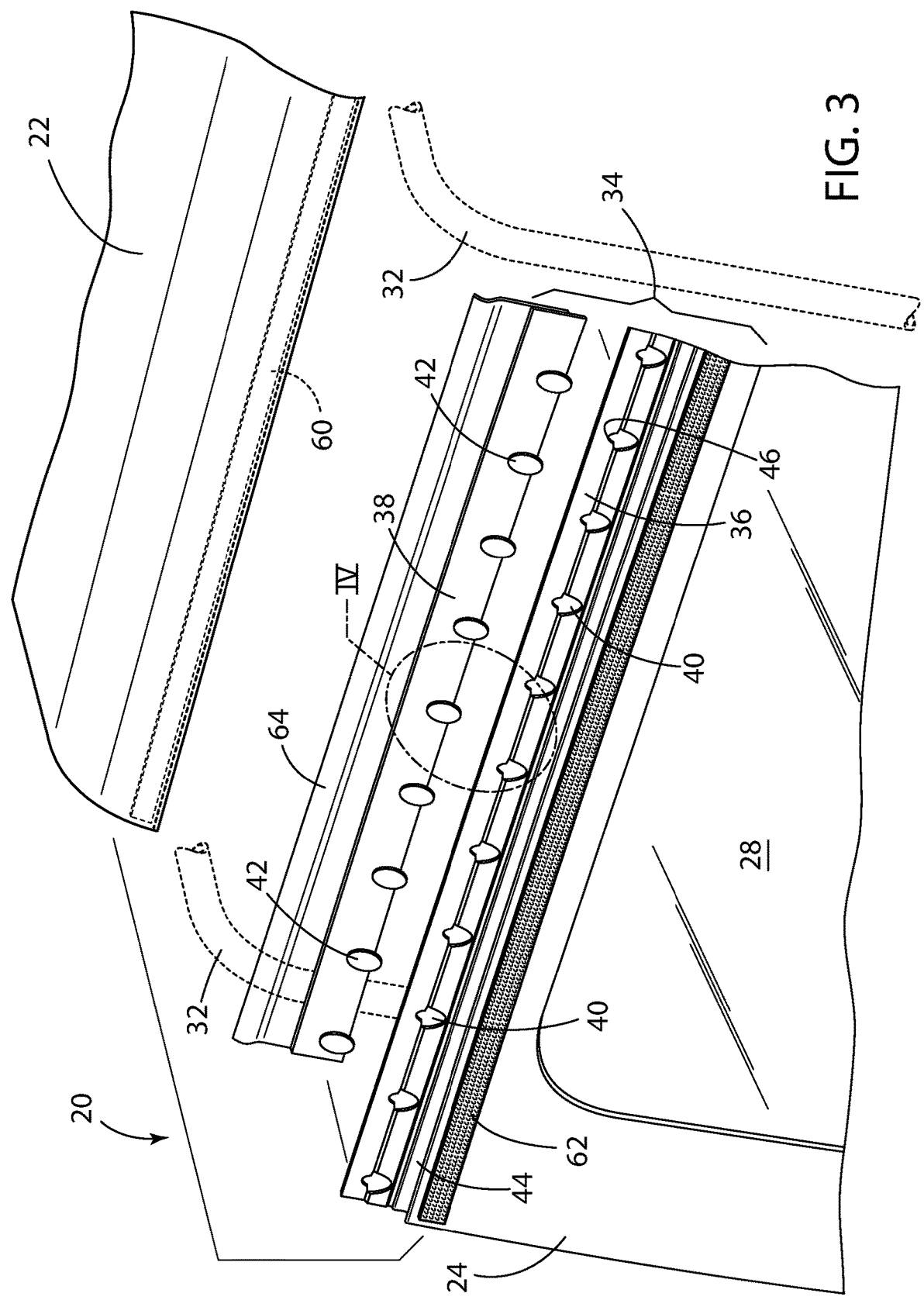
FIG. 3 illustrates an exploded perspective view of the sport utility vehicle having a soft top covering the cabin area according to the embodiment of FIG. 1.

The figures presented herein show a few of the exemplary approaches within the scope of the present embodiments. As shown in FIGS. 1-3, the present embodiments can involve several types of vehicles, such as a sport utility vehicle 20, having removable soft top (welt) made from various fabrics, canvas, vinyl and the like and may include the following exemplary illustrated panels: a roof panel 22; a side panel 24 (rear quarter panel); and a rear panel 26. The soft top components may be removably mounted to a rigid vehicle soft top frame 32. A tension bow 54 can connect side panel 24 to vehicle 20.

Side panel 24 may have an optional side lite 28 made of marine glass, Plexiglas, transparent/translucent vinyl, and the like. Similarly rear panel 26 may have an optional side lite 30 made of marine glass, Plexiglas, transparent/translucent vinyl, and the like. These optional lites may or may not be separately removable.

Figures 7A, 7B:
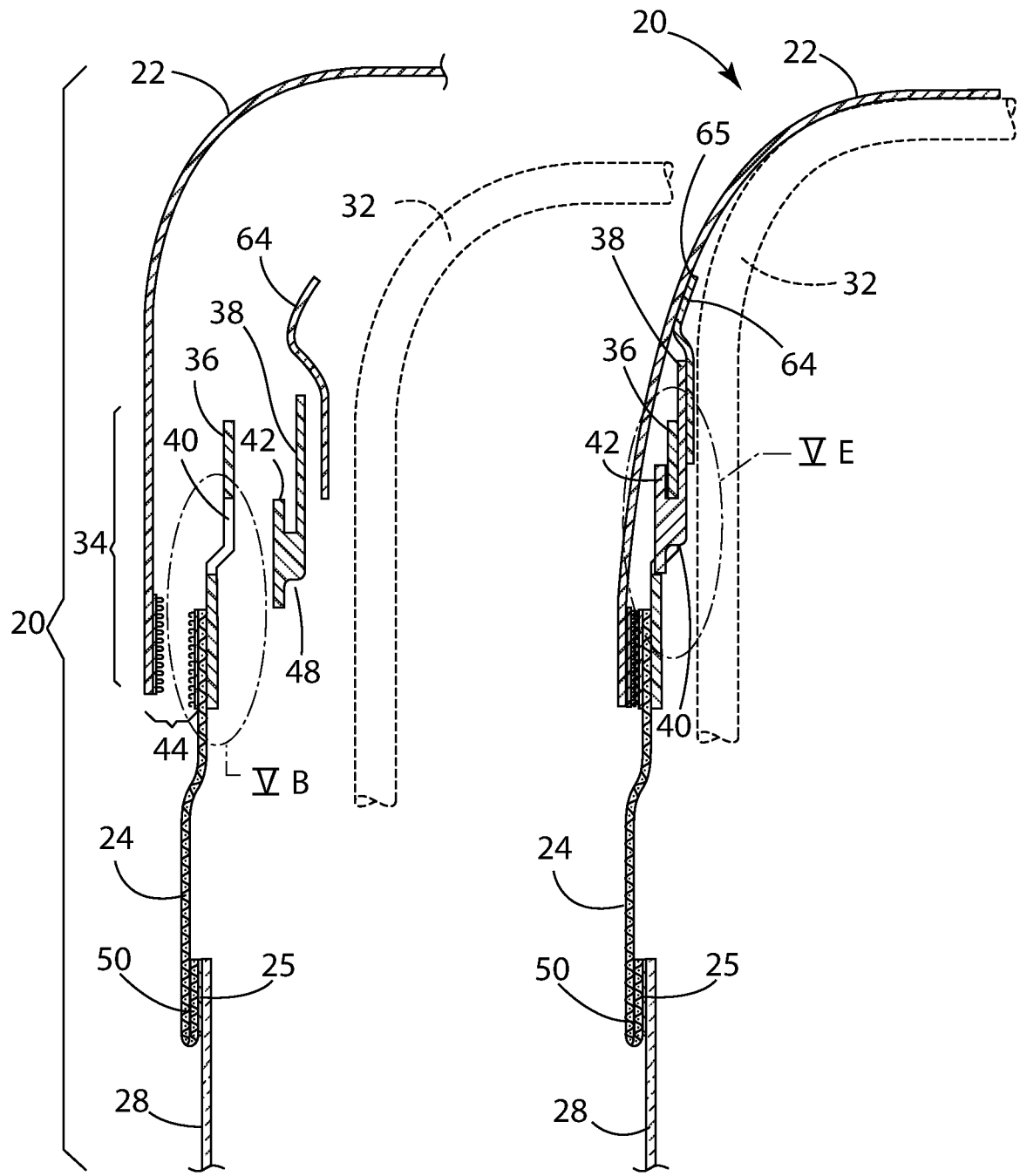
FIG. 7A is an exploded cross-sectional side view taken along section lines VIIB-VIIB of FIG. 1.
FIG. 7B is a cross-sectional side view taken along section lines VIIB-VIIB of FIG. 1.
Figure 8:
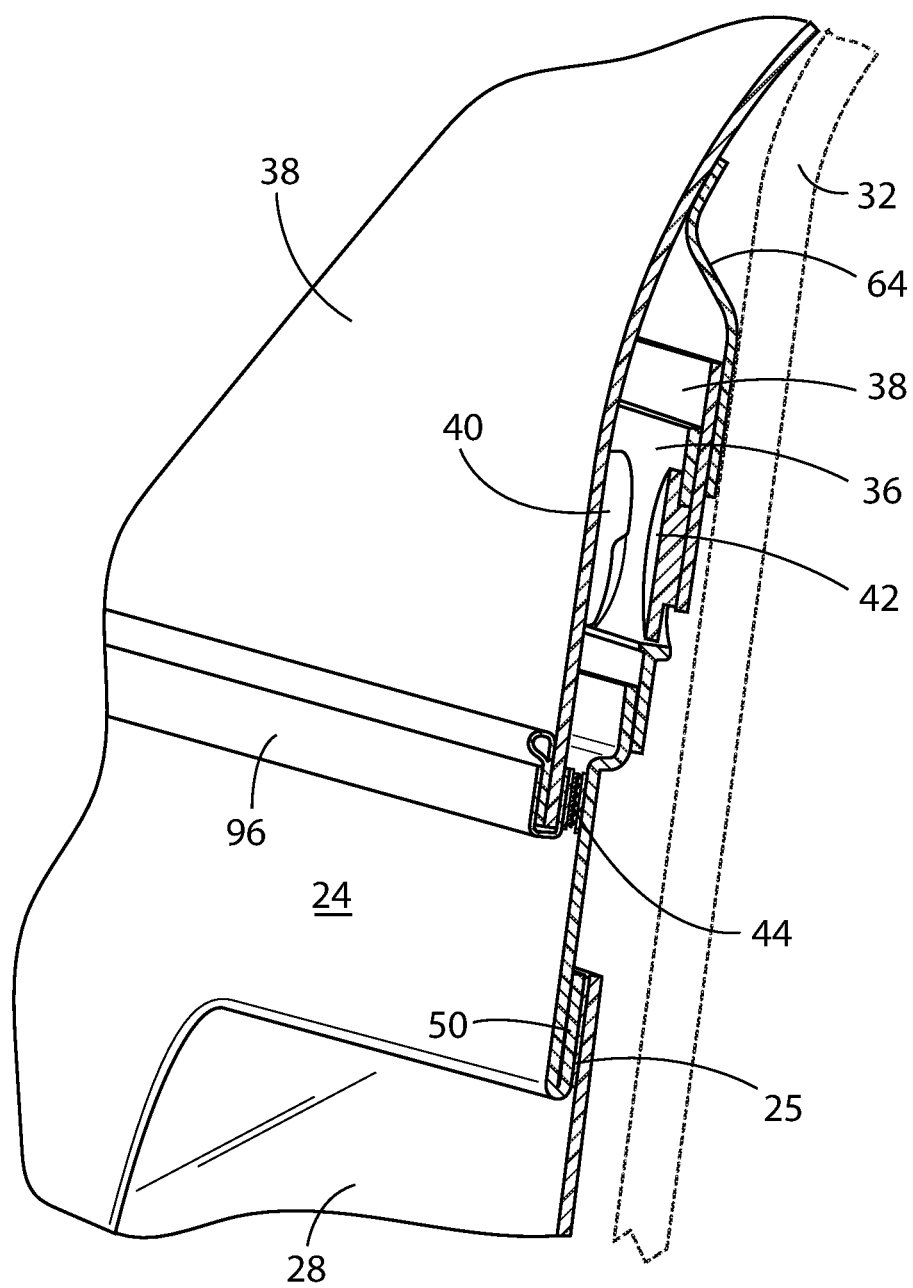
FIG. 8 is a perspective cross-sectional side view taken along section lines VIII-VIII of FIG. 1.

The present embodiments provide an interlocking attachment assemblies 34 disposed along a female assembly strip 36 (made from a plastic/deformable materials, e.g., nylon, polypropylene, polyethylene), and a male assembly strip 38 (made from a plastic/deformable materials, e.g., nylon, polypropylene, polyethylene). Assembly strips 36 and 38 can be mounted to the soft top components by a connection layer 25, run the length of the soft top component and be about 40 mm tall (Shown at 59 and 61 in FIG. 4). Assembly strips 36 and 38 can be rigid, semi-rigid and even flexible enough to allow up to a 90 degree bend (See FIG. 9). Connection layer 25 can be a sewn connection, glued, heat bonded, zippered and the like. The soft top fabric can have a material fold 50 to further strengthen the connection of the soft top to the assembly strips 36 and 38. The sewing footprint area (and other connection areas) can be length of the assembly attachment strip and about 10 mm wide, at a minimum (See e.g., sewing connections 65 in FIG. 7B). As illustrated, male strip 38 can be connected first to a fabric flap 64 to mount to soft top 22. Fabric flap 64 can be about 40-80 mm tall (shown at 63, preferably about 60 mm tall).

Disposed along the lengths of strips 36 and 38 are a plurality of interlocking attachment assemblies 34. Attachment assemblies 34 can be spaced (See, at 39 FIG. 2) along strips 36 and 38 in the range of approximately 50-150 mm (preferably about 75 mm) established using sound engineering principles to keep the soft top panels secured without buckling under high wind, such as highway speeds of a vehicle, such as up to 220 kilometers per hour. A second fastener (hook and loop 44, e.g., FIGS. 2-3 hook 60 and loop 62) can optionally be used to help reduce/prevent water seepage. Such hook and loop fasteners are commonly referred to under the trademark name VELCRO.

Interlocking attachment assemblies 34 as illustrated in FIGS. 1-11 can have a the following features: female assembly opening 40; male assembly tab 42 (button); gap 43 (FIG. 6B) female assembly opening notch 46; male assembly strip pedestal 48; curve 52 on male assembly strip 38; button edge 66; and female edge of opening 68.

Figure 4:
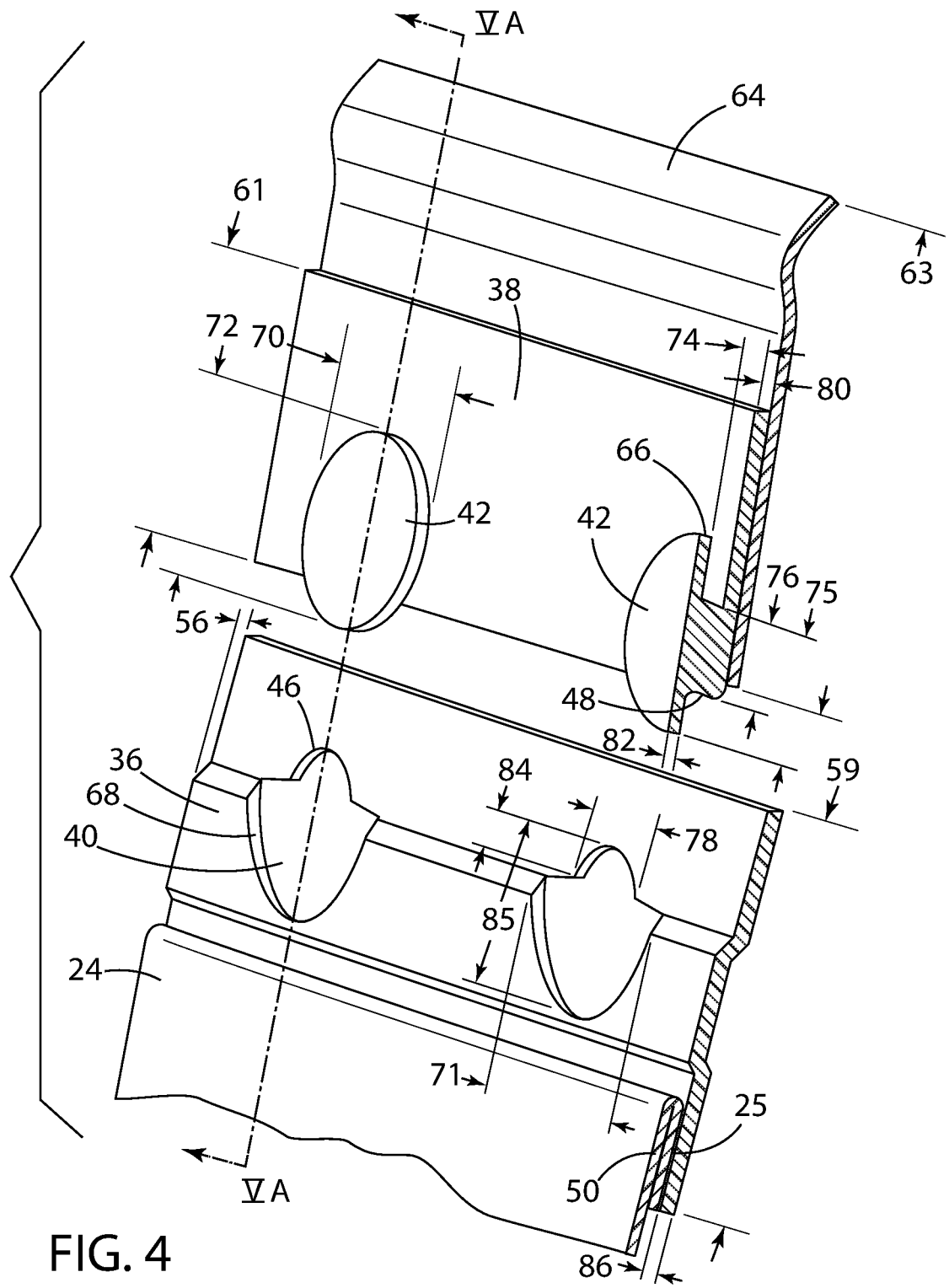
FIG. 4 illustrates a perspective close up view of area IV of FIG. 3.

FIGS. 4 and 6 shown exemplary dimensions of the attachment assemblies 34. Dimension 70 of width of tab can be about 10-30 mm and preferably 16 mm. A width of large portion of female opening 71 can be about the width of the oval of button 42 (allowing for approximately 0.25 mm in clearance), e.g., about 16 mm. A dimension of length of tab 72 can be about 15-40 mm and preferably 20 mm. A step dimension 56 (FIG. 6A) can be about 1.5 mm. The thickness of male strip 80 can be about 1.5 mm. The thickness of female strip step 86 can also be about 1.5 mm. The thickness of button 42 (at 82) can be 1.5 mm.

The height of stem 74 can be about 1.5 mm. The stem edge to opposite button edge dimension 75 can be about 16 mm. The diameter of stem 76 can be about 12 mm in length and 8 mm in width to match the proportions of the oval of tab 42, with a general button 42 overhang of stem 48 to be about 4 mm around its circumference. The diameter of width of opening to match stem diameter 78 can be approximately the diameter of narrow portion of stem 48 (e.g., about 8 mm allowing for approximately 0.25 mm in clearance). The height of opening 84 is configured to match stem outline. The female large opening height 85 can be equal to about half of the long dimension of button 42 plus about half of the long dimension of stem 48, e.g., 10 mm plus 6 mm to about 16 mm. The female strip step 56 is configured to match the thickness of the button.

Figure 5A:
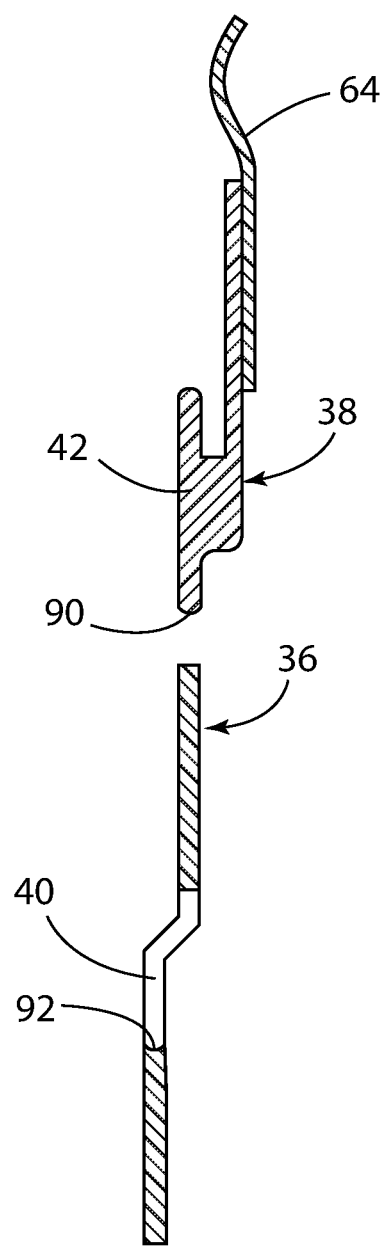
FIG. 5A is a cross-sectional side view taken along section lines VA-VA of FIG. 4.

As shown in FIG. 5A, an optional radius 90 and matching channel 92 can be included on button 42 edge and opening 40 respectively. This embodiment could allow for a snap fit to assure a user that the button/tab is locked in position. Also, the embodiment of FIGS. 6A and 6B, show another approach, where the opening 40 is sized to the diameter of button 42. In this embodiment, once the button/tab is inserted into strip 36i, strip 35 is then pulled down into a female assembly opening notch 46, then secured to the vehicle with tension bow 54.

Figure 9:
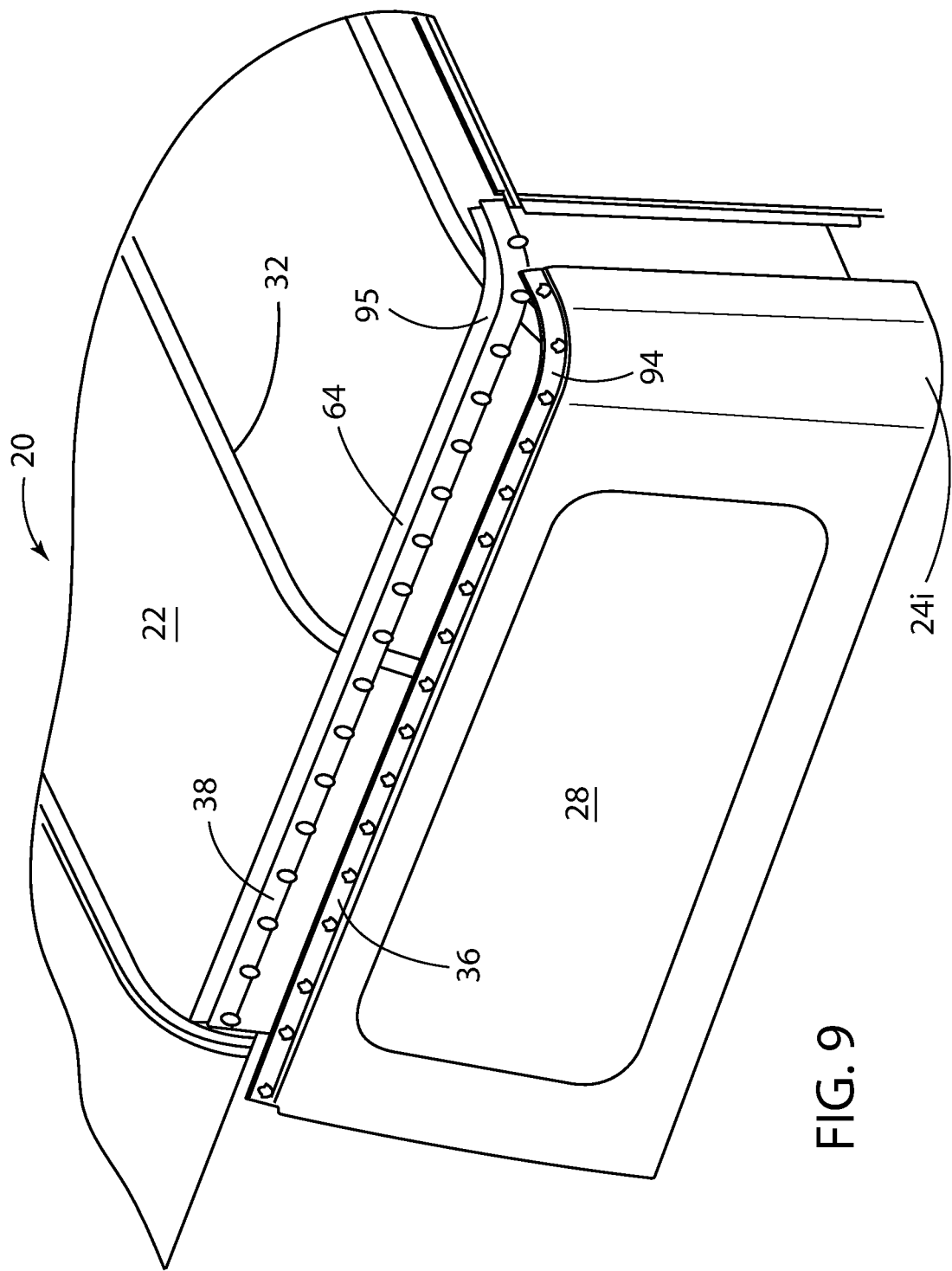
FIG. 9 illustrates an exploded left perspective view of a sport utility vehicle with a soft top covering the cabin area having an attachment assembly of the present embodiments according to a second approach.
Figure 10:
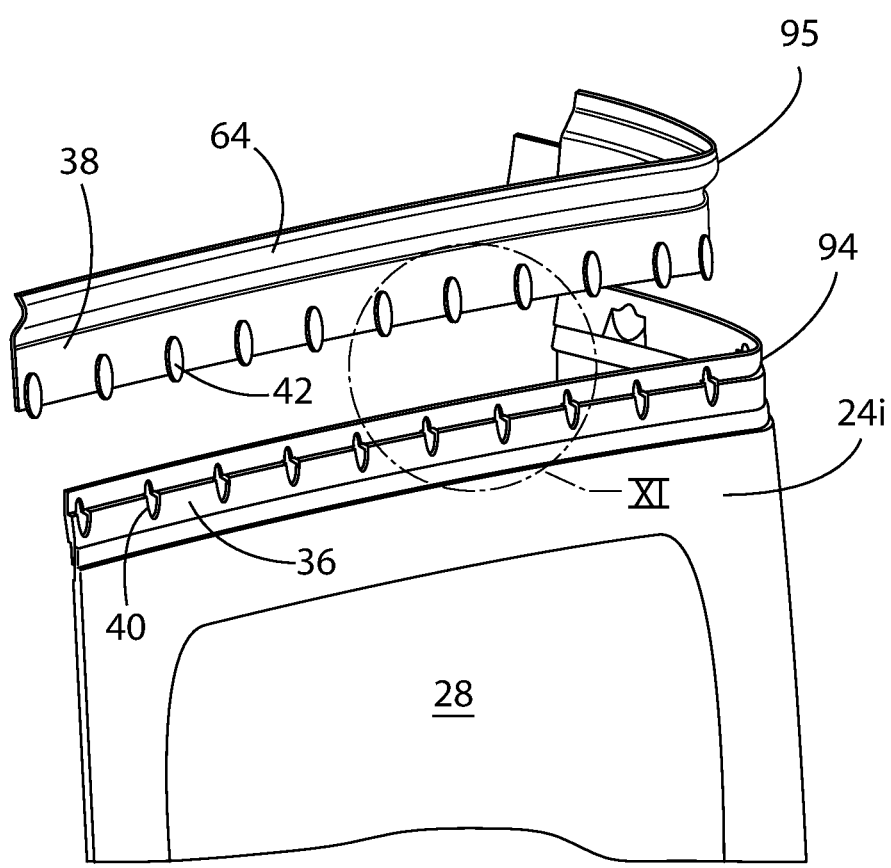
FIG. 10 illustrates an exploded right perspective view the attachment assembly of FIG. 9.
Figure 11:
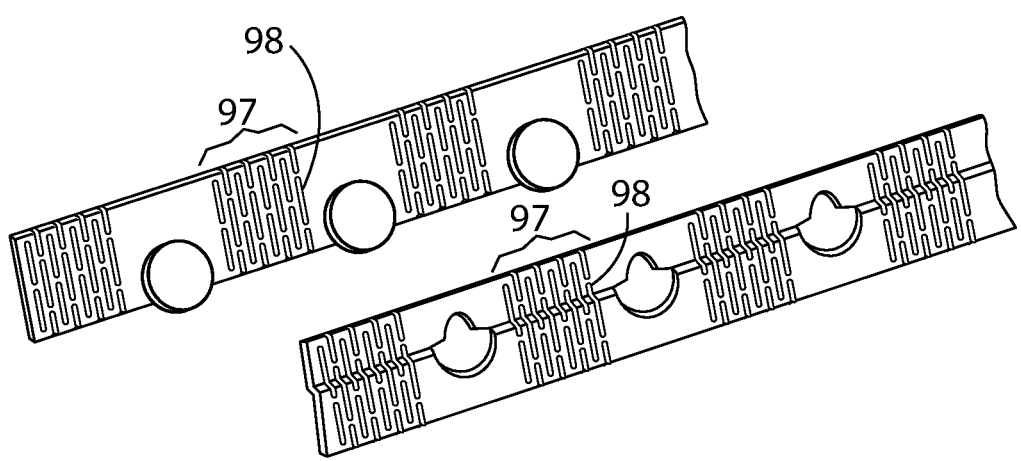
FIG. 11 is a close up view of area XI of FIG. 10 showing optional relief notches to allow bending of the attachment assembly strips.

FIGS. 9-11 show another approach having an alternate a rear panel configuration 26i, wherein strips 36 and 38 are flexible to allow even a 90 degree bend as show at wrap around side panel 94 and wrap around male strip for soft top 95 (FIGS. 9 and 10). This can be achieved by the materials used or by use of a living hinge. FIG. 11 illustrates and optional living hinge 97, which ca have slits/relief notches 98 to allow bending (can be about 1.5 mm wide). Slits/notches 98 may not be cut all the way through the strip, but rather can be a channel of a 0.75 mm radius in a 1.5 mm thick strip, or a squared channel 0.2 mm deep and 1.5 mm wide. In one embodiment both the radius and the squared channel can be matched on opposite sides of the strip separated by only about 0.3 mm of the strip. A variety of patterns and spacing are also considered within the scope of the present embodiments.

FIGS. 12-13 show another soft top component attachment assembly where the attachment sections can use the same extruded section on upper canopy and lower removable quarter window. The extrusion can be J-hooks. This embodiment can also incorporate a few interlocking features for positive attachment feel. As shown in the figures, upper J hook extrusion 100 can mate with a matching lower J hook extrusions 102. Optionally, the extrusions interlocking feature con include, for example, and upper J hook ridge 104 and a lower J hook ridge 106.

FIGS. 15-19 show another soft top component attachment assembly where the attachment sections can use a tongue and grove section. In one exemplary embodiment, an extruded upper section with cut-out notches for removable quarter window mates with the extruded insert tab flange. As shown in the figures an upper female strip of third embodiment 200 can mate a lower male of strip of third embodiment 202 by an upper female opening 204 of third embodiment.

Interlocking with a lower male matching tab 206 of third embodiment having a protrusion 208. An option locking feature can be a round edge 210 on protrusion 208 and notch 212 to mate with rounded edge 210.

Figure 20:
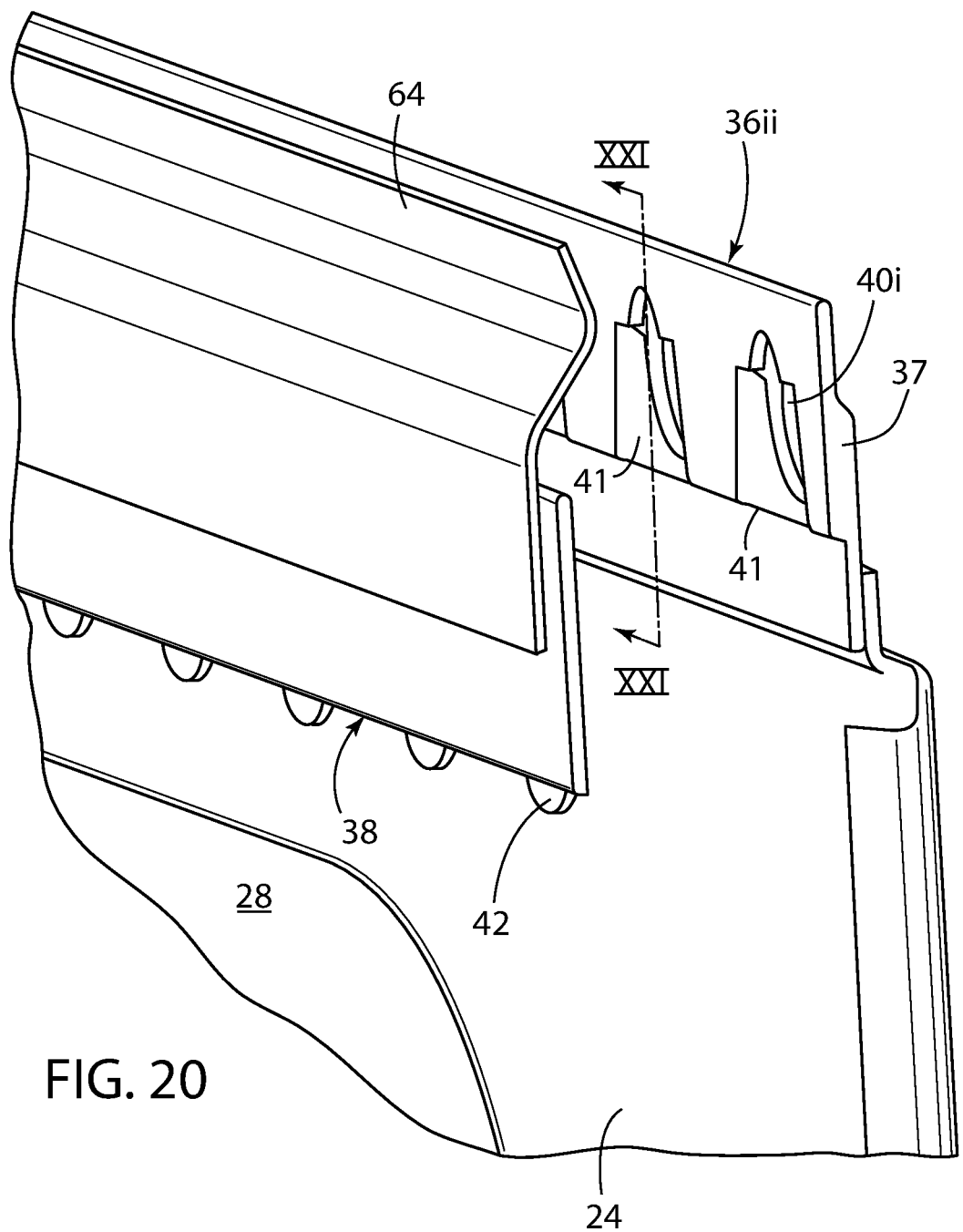
FIG. 20 illustrates a perspective interior view of a soft top covering the cabin area having a panel attachment assembly according to another approach one of the present embodiments.
Figure 21:
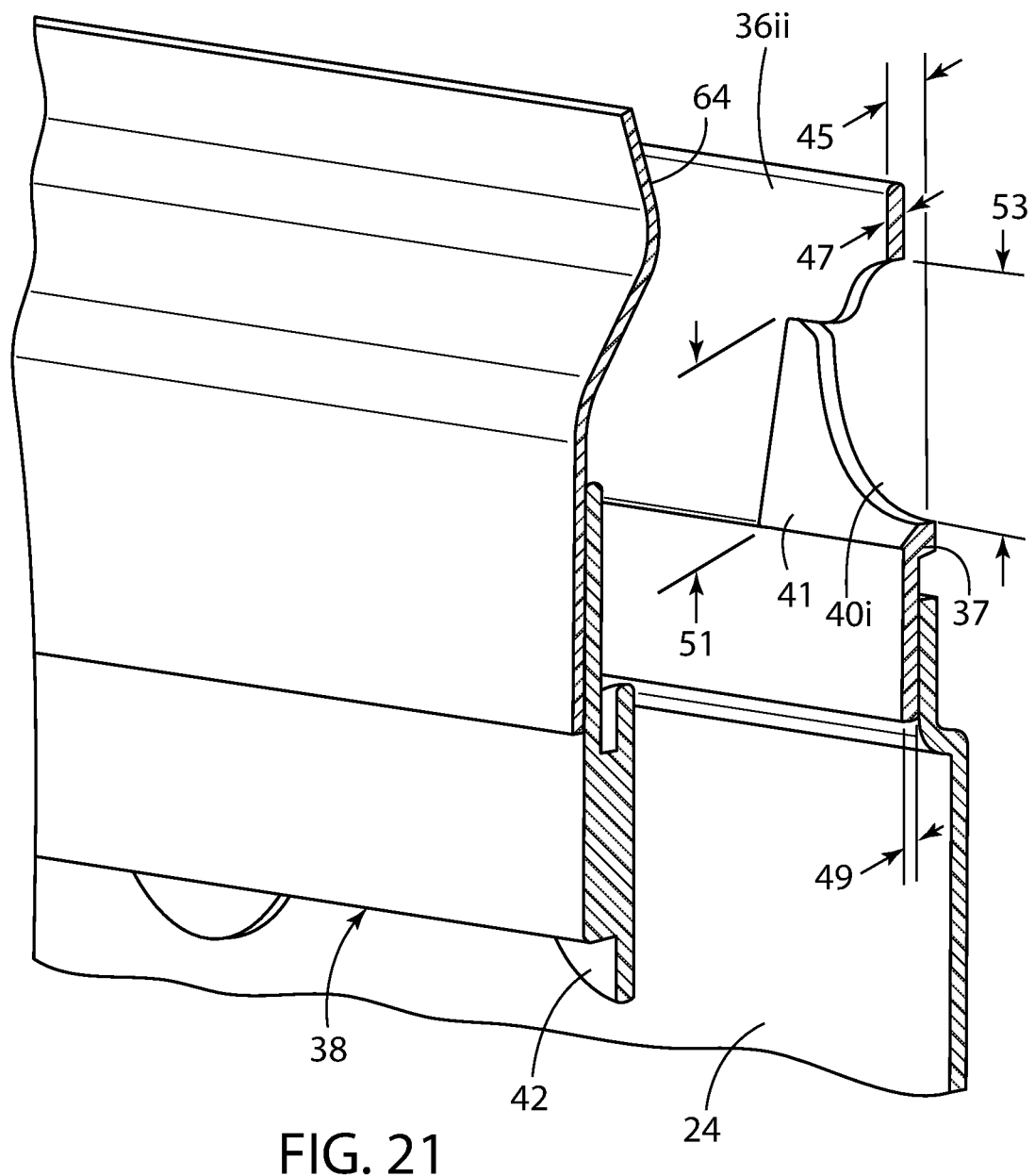
FIG. 21 illustrates a cross-sectional side view taken along section lines XXI-XXI of FIG. 20.

FIGS. 20-21 show another soft top component attachment assembly where the attachment assemblies' portion of a female attachment strip 36ii has an optional guide notch/chamfer 41 in step portion 37. For example, a back inside perspective view of a quarter/side panel 24 of the present embodiments is shown in FIG. 20 with an attachment flange of a chamfer 41 to help with alignment and attachment of male strip 38. As shown, step portion 37 for female strip 36ii can be configured to align with male assembly strip 38 with button/tab 42 and fabric tab 64 as described above. In female strip 36ii, tab 42 is guided into opening 40i by a chamfer 41, which slopes from a generally rectangular/trapezoid shape on an interiorly-facing surface of strip 36ii and sloping to the edge of opening 40i. For exemplary purposes step portion 37 can have a thickness of about 3 mm. Since the thickness of opening 40i can be about 1.5 mm, the chamfer 41 slope is achieved in the remaining 1.5 mm of thickness of the 3 mm step portion 37 leading to the edge of the 1.5 mm opening 40i. Although the rear entry point of opening 40i is rectangular/trapezoidal in shape, it is noted that this configuration is for exemplary purposes and many shapes can be envisioned within the scope of the present embodiments, such as an oval entry point on the interior surface of strip 36ii, which could be sized to a greater opening dimension 40i than on the front of female strip, which is sized to align with the dimensions of tab 42 with about 0.25 mm additional diameter for clearance. Thus, as shown, there is step thickness dimension 45 of 36ii of about 3.0 mm, upper portion thickness dimension 47 of 36ii of about 1.5 mm; a lower portion thickness dimension 49 of 36ii (about 1.5 mm); a step dimension of 51 about 15 to 20 mm); an opening dimension 53 as defined for the other exemplary embodiment with an added 0.25 mm for clearance.

The drawings and the foregoing descriptions are not intended to represent the only forms of assemblies in regard to the details of construction. Changes in form and in proportion of parts, as well as the substitution of equivalents, are contemplated as circumstances may suggest or render expedient. While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of description herein. Throughout this specification and the drawings and figures associated with this specification, numerical labels of previously shown or discussed features may be reused in another drawing figure to indicate similar features.

LIST OF REFERENCE NUMBERS 20 vehicle
22 soft top roof panel (welt) made from fabric, canvas, vinyl
24 soft top side panel (welt)
25 connection layer (connections can be sewn, glued, heat bonded, zippered)
26 soft top rear panel (welt)
26i an alternate rear panel configuration
28 optional side lite/rear quarter panel (optional, marine glass, Plexiglas, transparent/translucent vinyl) can also be removable
30 optional rear lite (optional, marine glass, Plexiglas, transparent/translucent vinyl) can also be removable 32 soft top frame
34 interlocking attachment assembly
34i interlocking welt assembly
36 female assembly strip (made from a plastic/deformable materials, e.g., nylon, polypropylene, polyethylene)
36ii female attachment strip
37 female strip 36ii step portion
38 male assembly strip (made from a plastic/deformable materials, e.g., nylon, polypropylene, polyethylene)
39 distance between locking/securing members (approx. in the range of 50-150 mm (preferably about 75 mm) dimension established using sound engineering principles to keep secure without buckling under high wind, such as highway speeds of a vehicle, such as up to 220 kilometers per hour)
40 female assembly opening
40i opening
41 chamfer
42 male assembly tab (button)
43 gap (FIG. 6B)
44 second welt fastener (hook and loop) to help reduce/prevent water seepage
45 step thickness dimension of 36ii (about 3.0 mm)
46 female assembly opening notch
47 upper portion thickness dimension of 36ii (about 1.5 mm)
48 male assembly strip pedestal
49 lower portion thickness dimension of 36ii (about 1.5 mm)
50 side lite fastener (stitch/glue/hook and loop)
51 step dimension (about 15 to 20 mm)
52 curve on male assembly strip 38
54 tension bow to connect side panel 24 to vehicle 20
53 opening dimension (about 20 mm with added 0.25 mm for clearance)
56 dimension of the step on female strip 36 (about 1.5 mm)
59 strip 36 height (about 40 mm)
60 hook
61 strip 36 height (about 40 mm)
62 loop
63 fabric flap height (about 60 mm)
64 fabric flap to mount male strip to soft top
65 sewing connections the length of the strip and about 10 mm wide minimum
66 button edge
68 female edge of opening
70 dimension of width of tab—about 10-30 mm and preferably 16 mm
71 width of large portion of female opening—about the width of the oval of button 42 (allowing for approximately 0.25 mm extra in clearance), e.g., about 16 mm.
72 dimension of length of tab—about 15-40 mm and preferably 20 mm
74 height of stem—about 1.5 mm
75 stem edge to opposite button edge dimension
76 diameter of stem—about 12 mm in length and 8 mm in width to match the proportions of the oval of tab 42
78 diameter of width of opening to match stem diameter—approximately the diameter of narrow portion of stem 48 (e.g., about 8 mm allowing for approximately 0.25 mm in clearance)
80 thickness of male strip (about 1.5 mm)
82 thickness of button
84 height of opening to match stem outline
85 female large opening height—equal to about half of the long dimension of button 42 plus about half of the long dimension of stem 48, e.g., 10 mm plus 6 mm to about 16 mm
86 thickness of female strip (about 1.5 mm)
88 female strip step to match the thickness of the button
90 rounded button edge
92 channel to match rounded button edge 90—user satisfaction to know installed properly
94 wrap around side panel
95 wrap around male strip for soft top
96 soft top side edge
97 living hinge
98 slits/relief notches to allow bending
100 upper J hook
102 lower J hook
104 upper J hook ridge
106 lower J hook ridge
200 upper female strip of third embodiment
202 lower male of strip of third embodiment
204 upper female opening of third embodiment
206 lower male matching tab of third embodiment
208 protrusion
210 round edge on protrusion 208
212 notch to mate with rounded edge 210

I claim:

1. An assembly to attach components of a vehicle soft top having a top panel, a side panel and a rear panel, comprising:
   a first strip connected along a portion of an edge of the top panel, the first strip having a plurality of spaced tabs raised from the first strip by a stem;
   a second strip connected along a portion of a top edge of at least the side panel, the second strip having a plurality of spaced openings, which are aligned and spaced to securely and removably receive and retain a portion of an edge of the tabs of the first strip and a portion of an edge of the stem of the tabs of the first strip.

2. The assembly of claim 1, wherein the first strip connection along a portion of the edge of the top panel further comprises a fabric strip connecting the first strip to the top panel.

3. The assembly of claim 1, wherein the strips are about 1.5 mm thick.

4. The assembly of claim 1, wherein the spaced tabs and openings are about 75 mm apart.

5. The assembly of claim 1, wherein the first and second strip are polyethylene or polypropylene.

6. The assembly of claim 1, wherein the bottom edge of the side panel is removably connectable to the vehicle by a tension bow.

7. The assembly of claim 1, wherein the soft top components are further connected by a hook and loop fastener.

8. The assembly of claim 1, wherein the plurality of spaced openings of the second strip are contained within a stepped portion and has a chamfer on the side where the plurality of spaced tabs enters, whereby attachment alignment is assisted.

9. The assembly of claim 8, wherein the stepped portion is twice the thickness of the thickness of the tab and the chamfer portion is half the thickness of the step portion where the tab passes as it enters the spaced openings.

10. An assembly to removably attach components of a vehicle roof, comprising:
    a first strip connected along a portion of a first edge of a first roof component, the first strip having a plurality of spaced tabs raised from the first strip by a stem;

a second strip connected along a portion of a second edge of a second roof component, the second strip having a plurality of spaced openings, which are aligned and spaced to securely and removably receive and retain a portion of an edge of the tabs of the first strip and a portion of an edge of the stem of the tabs of the first strip.

* * * * *